March 28, 1944.  C. C. COONS  2,345,461
REFRIGERATION
Filed Feb. 5, 1940  2 Sheets-Sheet 1

INVENTOR
Curtis C. Coons
BY
Harry S. [illegible]
ATTORNEY

Patented Mar. 28, 1944

2,345,461

UNITED STATES PATENT OFFICE 2,345,461

REFRIGERATION

Curtis C. Coons, North Canton, Ohio, assignor to The Hoover Company, North Canton, Ohio Application February 5, 1940, Serial No. 317,385

21 Claims. (Cl. 62—119.5)

This invention relates to the art of refrigeration and more particularly to a novel absorption refrigerating system which is particularly characterized in that the refrigerating mechanism embodies a multiple absorber which is arranged to improve the efficiency and operating characteristics of the mechanism and which permits the mechanism to be more advantageously assembled with the cabinet of a domestic refrigerating system while remaining within the rigid space limitations imposed upon such cabinet constructions.

More particularly it is an object of the present invention to provide an absorption refrigerating system which is more compact than previous constructions in that a large portion of the absorber may be at an elevation below the elevation of the liquid inlet to the analyzer and only a small portion thereof need be positioned above such inlet, thereby lowering the necessary minimum height of the boiler-analyzer absorber assembly.

Another object of the invention is to provide an absorption refrigerating mechanism of the three-fluid type having an absorber constructed and arranged so that the same may be assembled with the cabinet in such fashion as to provide the most efficient cooling arrangement of the absorber and of the fluids therein contained.

It is a more specific object of the invention to provide a three-fluid absorption refrigerating system which is constructed and arranged in such fashion that the absorber is utilized to promote most efficient circulation of cooling air over the air-cooled heat rejecting portions of the apparatus.

It is a still further object of the present invention to provide a three-fluid absorption refrigerating apparatus of the inert gas type in which a re-arrangement of the boiler-analyzer absorber circuit permits a more compact assembly and decreases the circulating load and lifting load on the absorption solution circulator both by lowering the total height within the apparatus and by utilizing certain static pressure differentials inherent in systems of this type to promote the absorption solution circulation.

It is a still further object of the present invention to provide an absorption refrigerating system in which certain portions thereof are so constructed and arranged that the same may be more flexibly designed and may be arranged to accommodate itself to limited space conditions more readily than previous constructions.

Other objects and advantages of the invention will become apparent as the description proceeds when taken in connection with the accompanying drawings, in which.

Figure 1:
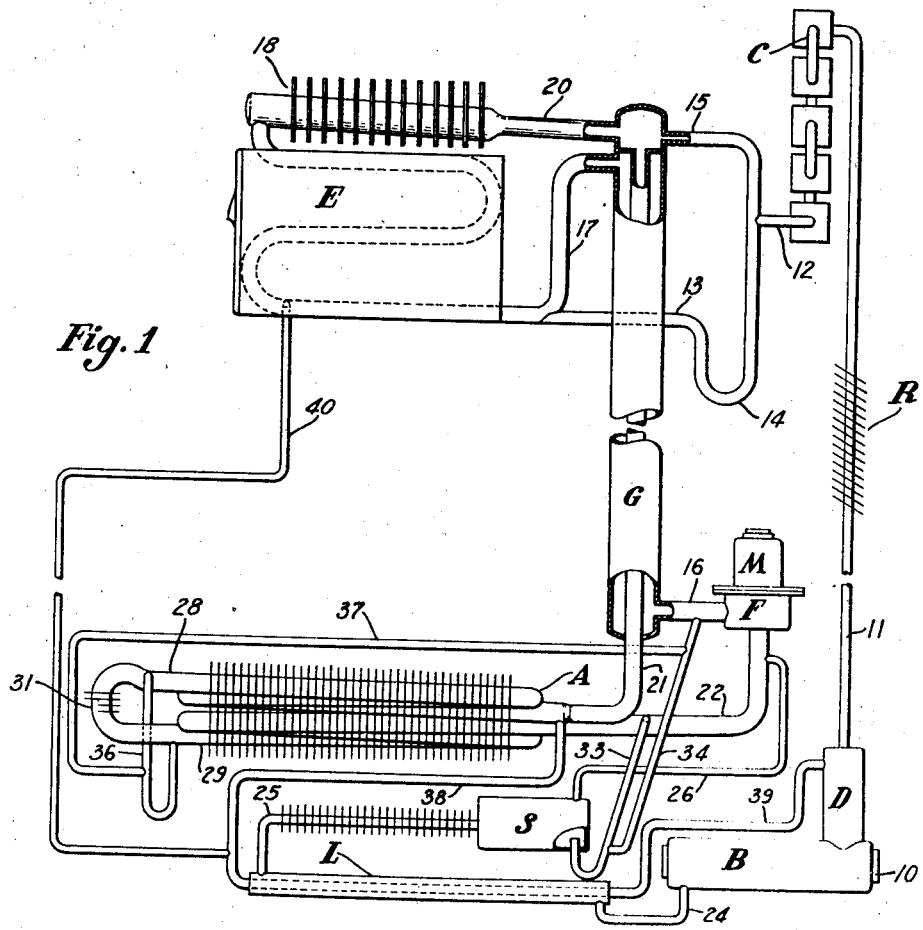
Figure 1 is a diagrammatic representation of a three-fluid absorption refrigerating system embodying the present invention.

Referring now in more detail to the drawing and first to Figure 1 thereof, there is disclosed a three-fluid absorption refrigerating system comprising a boiler B, an analyzer D, an air-cooled rectifier R, a tubular air-cooled condenser C, an evaporator E, a gas heat exchanger G, an inclined tubular air-cooled absorber A, a solution reservoir S, a liquid heat exchanger L, and a gas circulating fan F which is driven by an electrical motor M. These elements are suitably connected by a plurality of gas and liquid conduits which form a number of local gas and liquid circuits constituting a complete refrigerating system to which reference will be made in more detail hereinafter.

The above described refrigerating system will be charged with a suitable refrigerant, such as ammonia, a suitable solvent therefor, such as water, and an inert pressure equalizing medium preferably a dense gas like nitrogen.

The boiler B may be heated in any suitable manner as by a gas burner arranged to discharge waste products of combustion therefrom into a central flue 10 thereof or by an electrical cartridge heater.

The rate of heat supplied to the boiler and the operation of the circulating motor M will be governed in any suitable or desired manner by a control mechanism which may be responsive to the temperature of the evaporator or to the temperature of the refrigerated compartment as may be desired in a particular instance. A preferred form of control mechanism is disclosed and claimed in my copending application, Serial No. 148,424, filed June 16, 1937, now Patent No. 2,228,343, dated January 14, 1941.

The application of heat to the boiler B generates refrigerant vapor from the strong solution normally therein contained. The vapor so produced passes upwardly through the analyzer D in counterflow relationship to strong solution flowing downwardly therethrough whereby further refrigerant vapor is generated from the strong solution by the heat of condensation of absorption solution vapor driven from the boiler into the analyzer. The refrigerant vapor thus produced in the analyzer is conveyed therefrom to the upper portion of the air-cooled condenser C by means of the conduit 11 which includes the rectifier R. The rectifier R serves to condense vapors of absorption solution which may pass through the analyzer.

In the condenser C the refrigerant vapor is liquefied by heat exchange relationship with the cooling air flowing over the exterior walls of the condenser and the cooling fins mounted thereon. The liquid refrigerant thus produced is conveyed from the bottom portion of the condenser C to the bottom portion of the evaporator E by means of the condenser discharge conduit 12 and the evaporator supply conduit 13 which includes a U-shaped pressure balancing sealing trap 14. The condenser side of the trap 14 and the condenser discharge conduit 12 are vented by means of a conduit 15 to the inner or rich gas pass of the gas heat exchanger G. In the bottom portion of the evaporator to which the conduit 13 connects the liquid refrigerant meets a relatively rapidly flowing stream of inert gas which is supplied to the bottom portion of the evaporator E from the circulating fan F by way of the fan discharge conduit 16, the outer pass of the gas heat exchanger G and the evaporator gas supply conduit 17. The rapidly flowing inert gas propels the liquid refrigerant upwardly through the evaporator as the liquid is evaporating into the gas to produce refrigeration. After traversing the lower portion of the evaporator the residue liquid refrigerant is discharged into the upper finned box-cooling conduit 18 which is inclined slightly rearwardly as shown in Figure 1 in order that the liquid refrigerant may flow therethrough by gravity as the velocity of the inert gas in the large conduit 18 is too low to exert a propelling force on the liquid.

The evaporator has been shown diagrammatically herein. It may be of any desired or preferred construction, a preferred construction is disclosed and claimed in the copending case of Curtis C. Coons and William H. Kitto, Serial No. 220,189, filed July 20, 1938, now Patent No. 2,328,196, dated August 31, 1943.

After traversing the box-cooling conduit 18 the rich inert gas and residue liquid are conveyed from the conduit 18 to the absorber A by way of the conduit 20, the inner path of the gas heat exchanger G, and a conduit 21.

The exact construction and operation of the absorber will be described in detail hereinafter. For the present it is sufficient to note that the inert gas is brought into intimate contact in the absorber with absorbing solution previously denuded of refrigerant vapor in the boiler and as a consequence the refrigerant vapor content of the gas mixture supplied to the conduit 21 is absorbed by the absorbing solution and the resulting lean gas is conveyed from the absorber to the suction inlet of the circulating fan F by means of a conduit 22. The inert gas is then placed under pressure by the circulating fan and returned to the evaporator, thus completing the inert gas circuit.

The production of refrigerant vapor in the generator produces lean solution therein which is conveyed from the boiler to the solution reservoir S by way of the conduit 24, the liquid heat exchanger L, and the finned conduit 25 which also functions as a solution precooler.

The solution reservoir S is vented by means of a conduit 26 to the suction conduit 22 of the circulating fan F.

The absorber A is divided into an upper section 28 and a lower section 29. As illustrated each section of the absorber comprises three finned conduits with the adjacent conduits oppositely inclined and with each conduit inclined in such fashion that each section as a whole slopes downwardly from the top to the bottom portion thereof. While two sections have been illustrated each comprising three individual conduits, it is to be understood that a greater or lesser number of conduits may be utilized if desired. The rich gas conduit 21 connects to the bottom portion of the upper absorber section 28 and the upper portion of the section 28 is connected to the lower portion of the lower section 29 by means of a conduit 31 which is finned to provide for air cooling of the gas as it passes from 29 to 28. The fan suction conduit 22 communicates directly with the upper end of the lower absorber section 29. Thus, the rich inert gas first flows upwardly through the upper section 28, is then conveyed to the bottom portion of the lower section 29, flows upwardly through the lower section 29 and is then conveyed by the conduit 22 into the suction eye of the circulating fan F.

By reason of the venting conduit 15, it will be appreciated that the pressure prevailing in the boiler-analyzer condenser system is that prevailing in the rich gas side of the gas heat exchanger G which is a pressure somewhere intermediate the suction and discharge pressure of the circulating fan F. However, the pressure prevailing in the solution reservoir S is that prevailing in the suction side of the circulating fan F because of the conduit 26, wherefore the liquid level in the solution reservoir S is higher than that prevailing in the boiler-analyzer system by an amount equal to the pressure differential between the conduits 26 and 15 plus the pressure required to force the refrigerant vapor from the analyzer through the conduit 11 and condenser C.

The lean solution in the reservoir S is conveyed into the conduit 22 adjacent its point of connection with the upper end of the absorber section 29 by means of a gas lift pump conduit 33 to which pumping gas is supplied by means of a conduit 34 which connects between the fan discharge conduit 16 and the conduit 33 below the liquid level normally prevailing therein whereby the lean solution is elevated into the conduit 22 by gas lift action.

The lean solution thus elevated into the conduit 22 flows downwardly through the lower absorber section 29 by gravity in counterflow relationship to relatively lean inert gas flowing upwardly therethrough, whereby the refrigerant vapor content of the pressure equalizing medium mixture is materially reduced and very lean gas flows through the conduit 22.

After traversing the absorber section 29 the resulting partially strengthened solution is conveyed from the bottom portion thereof to the upper portion of the absorber 28; that is, into the inert gas connecting conduit 31 adjacent its point of connection with the upper end of the absorber 28 by means of a gas lift pump conduit 36. Pumping gas is supplied to the conduit 36 below the liquid level normally prevailing therein by means of a gas supply conduit 37 which connects to the conduit 34 previously described. That portion of the conduit 36 ahead of its junction with the conduit 37 is filled with solution and is desirably finned to provide for air cooling of the solution as it passes between the absorber sections.

The partially enriched absorption solution supplied to the upper portion of the absorber 28 by the gas lift pump 36 flows downwardly therethrough by gravity in intimate contact with and in counterflow relationship with the rich inert gas flowing upwardly through the absorber conduit 28 and supplied from the rich gas connection conduit 21.

After traversing the upper absorber section 28 the resulting strong solution is conveyed from the bottom portion of the absorber section 28 to the upper portion of the analyzer D by means of the conduit 38, the liquid heat exchanger L and the conduit 39, thus completing the absorption solution circuit.

In each section of the absorber the inert gas refrigerant vapor mixture and the absorption solution are brought into intimate contact with the result that the solution absorbs refrigerant vapor from the mixture and the resulting heat of absorption is dissipated to cooling air flowing over the exterior walls of the absorber conduit and in contact with the fins mounted thereon. The absorber conduits may have suitable inner constructions to promote absorption such as that disclosed in Patent No. 2,196,707, dated April 9, 1940.

The bottom portion of the evaporator E is provided with an anti-blocking drain 40 which connects between the strong solution return conduit 38 and the top portion of the bottom conduit of the evaporator. The conduit 40 will not completely drain the bottom portion of the evaporator but it will drain the same sufficiently to prevent the liquid from accumulating to a level sufficient to block inert gas flow through the evaporator. It will be understood that the drain 40 does not function to relieve the evaporator of non-volatile liquids which inevitably find their way thereinto. Such liquids are carried upwardly through the evaporator by the inert gas, flow through the conduits 18 and 20 by gravity and thence into the rich gas side of the gas heat exchanger from which they drain through the conduit 21 into the strong solution return line 38.

Figure 2:
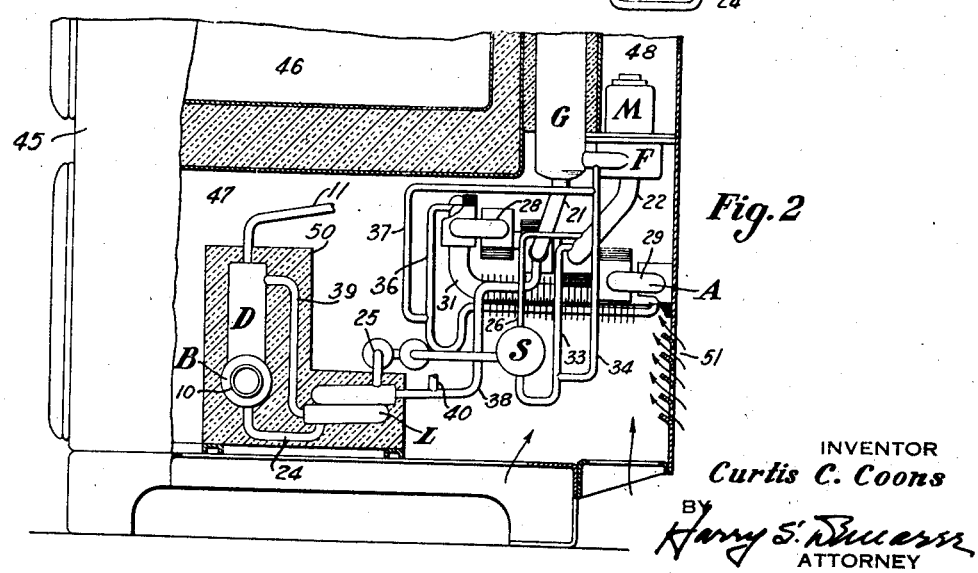
Figure 2 is a partial sectional elevational view of the refrigerating system of Figure 1 embodied in the cabinet of a domestic refrigerating machine.

Referring now to Figure 2, the lower portion of the apparatus is shown as the same is assembled in a cabinet of a domestic refrigerating apparatus. The cabinet 45 includes an insulated storage compartment 46 which will house the evaporator E in the conventional manner, a lower mechanism compartment 47 and a rear cooling air flue 48.

As is readily apparent from Figure 2, the boiler-analyzer liquid heat exchanger assembly is encased in a body of insulating material 50. This assembly is positioned with the boiler extending transverse of the mechanism compartment 47 and adjacent the front portion thereof whereby the burner which will discharge into the duct 10 will be readily accessible to the front of the apparatus for servicing, repairs, adjustments and the like and the high temperature insulated elements of the mechanism will be removed from the path of air flow over the heat rejecting portions of the apparatus whereby they will not heat such air and will not obstruct the free flow thereof.

The lower absorber section 29 is positioned in the lower rear corner of the mechanism compartment 47 directly beneath the lower end of the flue 48 while the higher absorber section 28 is positioned forwardly and upwardly of the section 29. This arrangement is such that cooling air which traverses any one conduit of either absorber section will not thereafter traverse any other portion of the absorber. Cooling air flowing over the absorber section 29 travels in a substantially vertical path from the bottom portion of the cabinet where air enters through the open bottom of the apparatus or through rear wall trouvers 51. Air which traverses the absorber section 28 also enters at the bottom portion of the cabinet, traverses the section 28 and thus turns slightly to the rear in order to enter the bottom portion of the cooling air flue 48.

It will be understood that the condenser C will be arranged in the upper portion of the flue 48 in a conventional manner. It is preferred to provide an off-take conduit for the waste products of combustion discharged from the boiler which will communicate with the heating tube 10 and will convey the products to the top portion of the apparatus. It is also preferred to position the motor M and circulator fan F in a corner of the flue 48 in order to remove the same from the path of cooling air flowing over the absorber section. It will be understood that there will be air flowing past the motor fan unit in order to cool the motor.

In previous constructions it has been necessary to position the bottom portion of the absorber at an elevation above the liquid inlet of the analyzer in order that the strong solution might flow by gravity from the absorber into the analyzer. As a consequence of this construction, the mechanism compartment in previous constructions has had to be at least equal in height to the combined height of the boiler-analyzer and absorber. With the present construction, it will be noted that the rich strong solution is taken from an intermediate point in the absorber and is returned to the analyzer wherefore the total height of the mechanism compartment 47 need be equal only to the total height of the boiler-analyzer and one-half of the absorber, thus effecting an appreciable saving in cabinet size and providing a more compact unit. Moreover, this saving in height relieves the elevating load on the circulating gas lift pumps for the reason that they are only called upon to elevate the solution through a distance equal to the one-half height of the absorber plus the distance between the liquid level in the boiler-analyzer and the level of the strong solution returned to the analyzer. In this connection, it must be noted that the analyzer herein is of the non-flooded plate type, that is an analyzer in which the strong solution flows back and forth across staggered plates while the vapors pass upwardly around the plates and in contact with the strong solution.

The very appreciable saving in height effected by this construction greatly decreases the problems encountered in fitting absorption refrigerating apparatus into domestic cabinets which must be held within iron-clad dimensional limitations.

The present invention also materially improves the efficiency of the apparatus for the following reasons: With the construction herein disclosed, the lean solution and lean inert gas are in that part of the absorber which is at the lowest elevation of the absorber circuit which is directly beneath the air flue. This portion of the absorber receives cold air directly from the space below and to the rear of the cabinet. As a result of this, the lean solution is able to strip the inert gas with a maximum effectiveness as the ability of the absorbing solution to absorb the refrigerant from the inert gas is a direct function of the temperature which can be maintained in the absorber at that point. In previous constructions the lean solution was supplied to the very top portion of the absorber and the lean inert gas was removed therefrom which brought the lean gas and liquid into contact in a portion of the absorber not well arranged for efficient cooling and also at the highest elevation of any portion of the absorber. The present construction reverses this arrangement with very beneficial results from an efficiency standpoint, while at the same time it effectively decreases the height required to house the apparatus and lowers the lifting load on the circulating gas lift pump.

Figure 3:
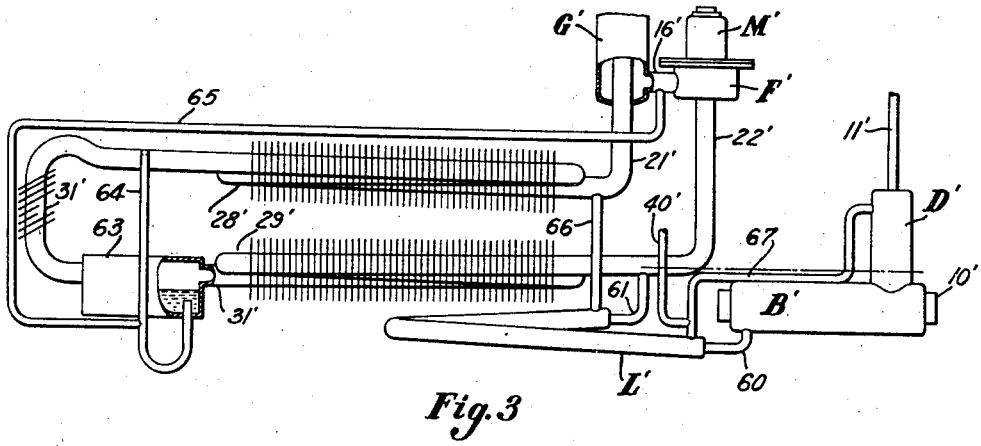
Figure 3 is a diagrammatic representation of a modified form of the solution circuit.
Figure 4:
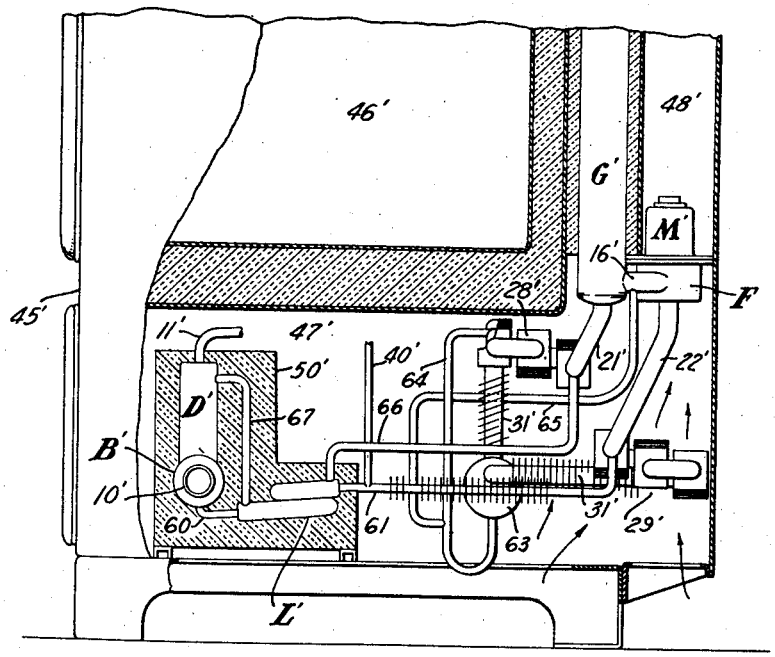
Figure 4 is a partial sectional elevational view of a cabinet construction embodying the refrigerating mechanism of Figure 3.

Figures 3 and 4 illustrate a modified form of the invention; since the form of the invention illustrated in Figures 3 and 4 is identical with that illustrated and described in connection with Figures 1 and 2, except for certain portions of the solution and inert gas circuit, only the lower portion of the apparatus has been illustrated. Certain portions of the apparatus illustrated in Figures 3 and 4 which are identical with portions of the apparatus illustrated and described in connection with Figures 1 and 2 are given the same reference characters primed.

In this form of the invention the lean solution formed in the boiler is conveyed therefrom to the lean gas suction conduit 22' adjacent its point of connection with the lower absorber section 29' by means of the conduit 60, the liquid heat exchanger L' and the conduit 61.

It will be noted that the absorber sections 28' and 29' are identical with the absorber sections 28 and 29 previously described. However, the absorber section 29' in this form of the invention is positioned substantially at the liquid level prevailing in the boiler analyzer system B'D' wherefore the lean solution may flow by gravity from the boiler directly into the lower absorber section.

The lean solution flows downwardly through the absorber section 29' in counterflow relationship to the gas flowing upwardly therethrough and drains from the lower end of the absorber section 29' through the gas conduit 31', which connects to the upper portion of the upper absorber section 28', to the solution reservoir 63. The lean solution collecting in the reservoir 63 is elevated therefrom into the conduit 31' adjacent its point of connection with the absorber 28' by means of the gas lift pumping conduit 64. Pumping gas is supplied to the conduit 64 by means of the conduit 65 which connects the circulating fan discharge conduit 16' to the pump 64 below the liquid level normally prevailing therein whereby the solution is elevated into the absorber 28' by gas lift action.

The lean solution flows downwardly through the absorber 28' by gravity in counterflow relationship to the inert gas refrigerant vapor mixture flowing upwardly therethrough, and after traversing the absorber 28', the rich solution is then returned from the bottom portion of the conduit 21' to the upper portion of the analyzer D' by way of the conduit 66, the liquid heat exchanger L' and the conduit 67, thus completing the solution circuit.

In this form of the invention the absorber section 29' is positioned very low in the mechanism compartment 47' and in the rear portion thereof directly beneath the air cooling flue 48' to provide a maximum length of chimney for the air which is heated by passing across the absorber, rectifier and condenser. This section of the absorber, which contains the lean gas and lean solution, is thus brought as low as possible to the floor to cause the same to be cooled by the coldest available cooling air. In this arrangement the absorber sections are relatively remote from each other whereby they may be more efficiently cooled without interference with each other and one gas lift pump is eliminated whereby the absorption solution may flow by gravity from the boiler-analyzer into the lower section of the absorber. With this construction, the upper section of the absorber has a free lateral path for air heated thereby into the bottom portion of the flue 48' whereby this section of the absorber is also cooled in a very efficient manner.

It will be understood that the point of connection between the conduits 61 and 22' will be at an elevation approximately equal to the liquid level in the boiler analyzer system and that the solution will flow due to the fact that a slightly higher pressure prevails in the boiler analyzer than that prevailing in the conduit 22'.

Thus, the present invention which allows the refrigerating apparatus may be constructed more compactly than prior constructions and more readily accommodates itself to the limitations inherent in domestic refrigerating cabinets. This desirable result is achieved principally because of two factors inherent in the present system, namely, only a portion of the absorber need be positioned above the analyzer and the sectional absorber construction allows the same to be arranged and designed with great freedom. It may readily be perceived that the two absorber sections can be positioned in a great many different combinations without in the least affecting the fundamental operation of the system because of the fact that the two absorber sections are relatively independent of each other. Though the two absorber sections have been shown as being equal in size herein, that is not a necessary feature. The relative sizes of the absorber sections may be varied to meet specific designs. This is a feature of great importance when arranging a refrigerating apparatus to fit into crowded quarters. Moreover, the present construction brings the lean gas and the weak solution into absorbing contact in the portion of the absorber which is most efficiently cooled and which is maintained at the lower temperature, thus stripping the inert gas to the maximum possible extent which results in improved evaporation and in a general improvement in the overall efficiency of the mechanism. Also, this cooling arrangement increases the effective length of the chimney which produces the cooling air flow over the heat rejecting portions of the apparatus and positions such heat rejecting portions in a manner to take the maximum advantage of the available air flow.

Due to the location of the boiler-analyzer, liquid heat exchanger and insulating jacket assembly at the front portion of the mechanism compartment, these elements are all removed from the direct path of air flow over the absorber sections whereby they do not interfere with such flow and they are so far forward under the food storage compartment that any air which is heated thereby will not find its way into the air-cooling system of the refrigerating apparatus to decrease the efficiency of that system.

While I have illustrated and described the invention in considerable detail, it is to be understood that various changes may be made in the arrangement, proportion and construction of parts without departing from the spirit of the invention or the scope of the appended claims.

I claim:

1. In a device of the character described a cabinet including a storage chamber and a mechanism chamber embodying an air flue, an absorption refrigerating mechanism associated with said cabinet including a cooling unit within said storage chamber and an absorber, a boiler assembly and a condenser in said mechanism chamber, said absorber comprising a lower section positioned directly beneath said flue and a higher section positioned laterally of said lower section, a gas lift pump for elevating absorption solution from said boiler assembly into said lower absorber section, and a second gas lift pump for elevating absorption solution from said lower absorber section into said upper absorber section.

2. In a device of the character described a cabinet including a storage chamber and a mechanism chamber embodying an air flue, an absorption refrigerating mechanism associated with said cabinet including a cooling unit within said storage chamber and an absorber, a boiler assembly and a condenser in said mechanism chamber, said absorber comprising a lower section positioned directly beneath said flue and a higher section positioned laterally of said lower section, said lower absorber being positioned to receive absorption solution from said boiler assembly by gravity, a gas lift pump for conveying absorption solution from said lower absorber section to said upper absorber section, said upper absorber section being arranged to discharge absorption solution to said boiler assembly by gravity.

3. Refrigerating apparatus comprising a cabinet having an insulated storage chamber, a lower mechanism compartment and a vertical cooling air flue opening into the upper end of the mechanism compartment, an absorption refrigerating system associated with said cabinet comprising an inert gas circuit including a tubular air-cooled absorber in said mechanism chamber and a cooling unit, an absorption solution circuit including a boiler assembly and said absorber, said absorber comprising a lower section arranged to receive lean solution from said boiler assembly and to discharge lean inert gas to said cooling unit and an upper section arranged to receive rich gas from said cooling unit and to discharge strong solution to said boiler assembly, said lower absorber section being located directly beneath the lower end of said air flue whereby the weak solution and lean inert gas are maintained at a low temperature and a straight line cooling air flow is provided over said lower absorber section.

4. Refrigerating apparatus comprising a cabinet having an insulated storage chamber, a lower mechanism compartment and a vertical cooling air flue opening into the upper end of the mechanism compartment, an absorption refrigerating system associated with said cabinet comprising an inert gas circuit including a tubular air-cooled absorber in said mechanism chamber and a cooling unit, an absorption solution circuit including a boiler assembly and said absorber, said absorber comprising a lower section arranged to receive lean solution from said boiler assembly and to discharge lean inert gas to said cooling unit and an upper section arranged to receive rich gas from said cooling unit and to discharge strong solution to said boiler assembly, said upper absorber being located beneath the lower end of said air flue and laterally thereof with the highest end thereof remote from said air flue whereby cooling air traversing said upper section has a free upwardly inclined path to the bottom of said air flue without traversing said upper section or any part thereof more than once, said boiler assembly being positioned remotely from said flue and absorber sections to prevent interference with cooling air flow.

5. Absorption refrigerating apparatus of the three-fluid type comprising a boiler-analyzer, an absorber comprising upper and lower units each of which comprises a plurality of inclined substantially horizontal conduits arranged to provide a substantially continuous downward path of flow of absorption solution therethrough, means for leading a mixture of inert gas and refrigerant vapor upwardly through said upper unit and thence to the lower portion of said lower unit to flow upwardly therethrough, means for leading weak absorption solution from said boiler to the upper portion of said lower unit to flow therethrough counter to said inert gas refrigerant vapor mixture, means for conveying the solution which has passed through said lower unit to the upper portion of said upper unit, and means for conveying the resulting solution from the lower portion of said upper unit into said analyzer.

6. Absorption refrigerating apparatus of the three-fluid type comprising a boiler-analyzer, an absorber comprising upper and lower units each of which comprises a plurality of inclined substantially horizontal conduits arranged to provide a substantially continuous downward path of flow of absorption solution therethrough, means for leading a mixture of inert gas and refrigerant vapor upwardly through said upper unit and thence to the lower portion of said lower unit to flow upwardly therethrough, means for leading weak absorption solution from said boiler to the upper portion of said lower unit to flow therethrough counter to said inert gas refrigerant vapor mixture, means for conveying the solution which has passed through said lower unit to the upper portion of said upper unit, and means for conveying the resulting solution from the lower portion of said upper unit into said analyzer, at least a portion of said lower unit being positioned at an elevation below the elevation at which the solution is returned to said analyzer.

7. Absorption refrigerating apparatus of the three-fluid type comprising a boiler-analyzer, an absorber comprising upper and lower units each of which comprises a plurality of inclined substantially horizontal conduits arranged to provide a substantially continuous downward path of flow of absorption solution therethrough, means for leading a mixture of inert gas and refrigerant vapor upwardly through said upper unit and thence to the lower portion of said lower unit to flow upwardly therethrough, means for leading weak absorption solution from said boiler to the upper portion of said lower unit to flow therethrough counter to said inert gas refrigerant vapor mixture, means for conveying the solution which has passed through said lower unit to the upper portion of said upper unit, and means for conveying the resulting solution from the lower portion of said upper unit into said analyzer, said upper unit being located at an elevation above said analyzer.

8. Absorption refrigerating apparatus of the three-fluid type comprising a boiler-analyzer, an absorber comprising upper and lower units each of which comprises a plurality of inclined substantially horizontal conduits arranged to provide a substantially continuous downward path of flow of absorption solution therethrough, means for leading a mixture of inert gas and refrigerant vapor upwardly through said upper unit and thence to the lower portion of said lower unit to flow upwardly therethrough, means for leading weak absorption solution from said boiler to the upper portion of said lower unit to flow therethrough counter to said inert gas refrigerant vapor mixture, means for conveying the solution which has passed through said lower unit to the upper portion of said upper unit, and means for conveying the resulting solution from the lower portion of said upper unit into said analyzer, at least a portion of said lower unit being located below the liquid level normally prevailing in said boiler-analyzer.

9. Absorption refrigerating apparatus comprising an evaporator, an air-cooled absorber having a pair of separate units located at different elevations, a boiler, an analyzer in open communication with said boiler, means for liquefying refrigerant vapor produced in said boiler and for supplying the liquid to said evaporator, means connected to circulate an inert gas between said evaporator and said absorber, a first gas lift pump connected to convey lean solution from said boiler to said lower absorber unit, a second gas lift pump connected to convey solution from said lower absorber unit to said upper absorber unit, and means for conveying absorption solution from said upper absorber unit to said analyzer, said lower absorber unit being located below the top of said analyzer.

10. Absorption refrigerating apparatus comprising an evaporator, an air-cooled absorber having an upper unit and a lower unit, a boiler assembly, means for liquefying refrigerant vapor produced in said boiler assembly and for supplying the liquid to said evaporator, means connected to circulate an inert gas between said evaporator and said absorber, said lower absorber unit being located at an elevation such that lean solution will flow thereinto by gravity, a gas lift pump for conveying solution from said lower absorber unit into said upper absorber unit, and means for draining solution from said upper absorber unit into said boiler assembly.

11. Absorption refrigerating apparatus comprising an evaporator, an air-cooled absorber having a pair of separate units located at different elevations, a boiler, an analyzer in open communication with said boiler, means for liquefying refrigerant vapor produced in said boiler and for supplying the liquid to said evaporator, a power operated element connected to circulate an inert gas between said evaporator and said absorber, said absorber being directly connected to the suction side of said power operated element, means for conveying solution from said boiler to the lower of said absorber units, venting means connected to subject said boiler-analyzer assembly to a pressure higher than the suction pressure of said power operated element whereby the pressure differential existing between said boiler and said absorber aids in circulating solution therebetween, means for conveying solution from the lower one of said absorber units to the higher of said absorber units, and means for conveying solution from the higher of said absorber units to said analyzer.

12. Absorption refrigerating apparatus comprising an evaporator, an air-cooled absorber having a pair of separate units located at different elevations, a boiler, an analyzer in open communication with said boiler, means for liquefying refrigerant vapor produced in said boiler and for supplying the liquid to said evaporator, a power operated element connected to circulate an inert gas between said evaporator and said absorber, said absorber being directly connected to the suction side of said power operated element, means for conveying solution from said boiler to the lower of said absorber units, venting means connected to subject said boiler-analyzer assembly to a pressure higher than the suction pressure of said power operated element whereby the pressure differential existing between said boiler and said absorber aids in circulating solution therebetween, a gas lift pump arranged to propel absorption solution from said boiler to the lower of said absorber units, a second gas lift pump arranged to propel absorption solution from the lower of said absorber units to the higher of said absorber units, and means for conveying absorption solution from the higher of said absorber units to said analyzer, the lower of said absorber units being located at an elevation below the elevation at which absorption solution is supplied to said analyzer.

13. Absorption refrigerating apparatus comprising an evaporator, an air-cooled absorber having a pair of separate units located at different elevations, a boiler, an analyzer in open communication with said boiler, means for liquefying refrigerant vapor produced in said boiler and for supplying the liquid to said evaporator, a power operated element connected to circulate an inert gas between said evaporator and said absorber, said absorber being directly connected to the suction side of said power operated element, means for conveying solution from said boiler to the lower of said absorber units, venting means connected to subject said boiler-analyzer assembly to a pressure higher than the suction pressure of said power operated element whereby the pressure differential existing between said boiler and said absorber aids in circulating solution therebetween, the lower of said absorber units being at an elevation such that absorption solution will flow thereinto by gravity aided by the above-mentioned pressure differential, means for conveying absorption solution from the lower of said absorber units to the higher of said absorber units, and means for conveying absorption solution from the higher of said absorber units to said analyzer.

14. In a device of the character described a cabinet including a storage chamber and a mechanism chamber embodying an air flue, an absorption refrigerating mechanism associated with said cabinet including a cooling unit within said storage chamber and an absorber, a condenser and a boiler assembly including a heating part in said mechanism chamber, said absorber including an elongated finned conduit positioned beneath the lower end of said flue and at a level below the liquid level in the heating part of said boiler assembly, means for conveying absorption solution from said heating part of said boiler assembly to said absorber conduit by gravity, and a gas lift pump arranged to convey absorption solution which has passed through said absorber conduit to an elevation above the liquid level in the heating part of said boiler assembly.

15. In a device of the character described a cabinet including a storage chamber and a mechanism chamber embodying an air flue, an absorption refrigerating mechanism associated with said cabinet including a cooling unit within said storage chamber and an absorber, a boiler assembly and a condenser in said mechanism chamber, said absorber including an elongated finned conduit positioned beneath the lower end of said flue and at a level below the liquid level in said boiler assembly, said boiler assembly being positioned laterally of said absorber and of the lower end of said flue whereby said boiler assembly does not obstruct free flow of cooling air across said absorber, means for conveying absorption solution from said boiler assembly to said conduit by gravity, and a gas lift pump arranged to convey absorption solution which has passed through said conduit to an elevation above the liquid level in said boiler assembly.

16. Absorption refrigerating apparatus including a boiler assembly, a condenser, an evaporator, an absorber, means for liquefying refrigerant vapor produced in said boiler and for supplying the liquid to said evaporator, means providing for circulation of inert gas between said evaporator and said absorber, said absorber comprising a first air cooled section consisting of a plurality of serially connected finned conduits, a second air cooled section consisting of a plurality of serially connected finned conduits, said second absorber section being positioned at an elevation above said first section, means for conveying absorption solution from said boiler assembly to said first section, means for conveying solution from said first section to said second section, and means for conveying solution from said second section to said boiler assembly.

17. In a device of the character described a cabinet including a storage chamber and a mechanism chamber embodying an air flue, an absorption refrigerating mechanism associated with said cabinet including a cooling unit within said storage chamber and an absorber, a boiler assembly and a condenser in said mechanism chamber, said absorber having a lower air cooled portion in vertical alignment with the lower end of said flue and an upper air cooled portion positioned laterally of said lower portion, means for conveying absorption solution from said boiler assembly to said lower absorber portion, means for conveying absorption solution from said lower absorber portion to said upper absorber portion, and means for conveying absorption solution from said upper absorber portion to said boiler assembly.

18. In a device of the character described a cabinet including a storage chamber and a mechanism chamber arranged for flow of cooling air therethrough, an absorption refrigerating apparatus associated with said cabinet including a cooling unit in said storage chamber and an absorber, a generator assembly and a condenser in said mechanism chamber, said absorber comprising a first air-cooled section positioned in the lower portion of said mechanism chamber and arranged to receive absorption solution from said generator assembly by gravity, a second air cooled absorber section positioned above and laterally of said first absorber section and arranged to discharge absorption solution to said generator assembly by gravity, and means for conveying absorption solution from said first absorber section to said second absorber section.

19. In a device of the character described, a cabinet structure embodying an insulated refrigerating chamber and a passageway for cooling air, an absorption refrigerating mechanism associated with said cabinet structure embodying a cooling unit positioned within said refrigerating chamber, a tubular condenser and an elongated sinuous absorber conduit arranged to be cooled by air flowing through said passageway, a boiler, means for heating said boiler, said absorber being positioned below the liquid level in said boiler, means for conveying absorption solution by gravity from said boiler to said absorber conduit, and means for conveying absorption solution from said absorber conduit to an elevation above the liquid level in said boiler and for conducting the absorption solution into said boiler.

20. In a device of the character described a cabinet including a storage chamber and a mechanism chamber embodying an air flue extending vertically along a wall of said storage chamber, an absorption refrigerating mechanism associated with said cabinet including a cooling unit within said storage chamber, an absorber in said mechanism chamber, a condenser in said air flue, a boiler assembly in said mechanism chamber, means providing for circulation of absorption solution between said boiler assembly and said absorber, means providing for circulation of inert gas between said absorber and said cooling unit, and means for conveying refrigerant liquid from said condenser to said evaporator, said absorber comprising a lower section positioned directly beneath said flue and a higher section positioned laterally of said lower section and at a substantially higher lever and beneath said storage chamber.

21. In a device of the character described a cabinet including a storage chamber and a mechanism chamber embodying an air flue, an absorption refrigerating mechanism associated with said cabinet including a cooling unit within said storage chamber, an absorber in said mechanism chamber, a boiler assembly and a condenser in said mechanism chamber, means providing for circulation of absorption solution between said boiler assembly and said absorber, means providing for circulation of inert gas between said absorber and said cooling unit, and means for conveying refrigerant liquid from said condenser to said evaporator, said absorber comprising a lower section positioned directly beneath said flue and a higher section positioned laterally of said lower section beneath said storage chamber, said inert gas circuit being so connected to said absorber and said evaporator that inert gas traverses the lower section of said absorber beneath said flue after traversing the upper section thereof and is conducted from said lower section of said absorber to said evaporator.

CURTIS C. COONS.